US006957066B1

(12) United States Patent
Stammers et al.

(10) Patent No.: US 6,957,066 B1
(45) Date of Patent: Oct. 18, 2005

(54) METHOD AND APPARATUS FOR REGISTERING A MOBILE DEVICE

(75) Inventors: Timothy P. Stammers, Raleigh, NC (US); Malcolm M. Smith, Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 662 days.

(21) Appl. No.: 09/859,269

(22) Filed: May 16, 2001

(51) Int. Cl.[7] .......... H04Q 7/20; H04Q 7/38

(52) U.S. Cl. .......... 455/435.1; 455/435.1; 455/435.2; 455/410; 455/411; 455/422.1; 455/414.1; 455/426.1; 370/351; 370/352

(58) Field of Search .......... 455/435.1, 435.2, 455/410, 411, 422.1, 426.1, 426.2, 432.1, 455/433, 432.2, 445, 466, 517, 414.1, 500, 455/560, 561, 403, 550.1, 412.1, 412.2, 551, 455/553, 73; 370/314, 338, 352, 349, 351, 370/355, 401, 467

(56) References Cited

U.S. PATENT DOCUMENTS 5,991,407 A * 11/1999 Murto .......... 380/248
6,223,042 B1 4/2001 Raffel .......... 455/455
6,496,704 B2 * 12/2002 Yuan .......... 455/466
6,504,839 B2 1/2003 Valentine et al. .......... 370/354
6,507,589 B1 1/2003 Ramasubramani et al. . 370/465
6,526,033 B1 2/2003 Wang et al. .......... 370/338
6,542,491 B1 4/2003 Tari et al. .......... 370/338
6,553,227 B1 * 4/2003 Ho et al. .......... 455/433
6,564,055 B1 5/2003 Hronek .......... 455/433
6,591,098 B1 7/2003 Shieh et al. .......... 455/419
6,628,965 B1 9/2003 LaRosa et al. .......... 455/557
6,687,743 B1 2/2004 Innes .......... 709/206
6,724,801 B1 * 4/2004 Sylvain .......... 370/352
6,754,321 B1 6/2004 Innes et al. .......... 379/201.03

* cited by examiner

*Primary Examiner*—Keith Ferguson
(74) *Attorney, Agent, or Firm*—Baker Botts L.L.P.

(57) ABSTRACT

A communication system includes a radio access network (RAN) and a core packet network that allows registration of mobile devices. A temporary mobile device identifier (TMDI) assigned to the mobile device includes, at least in part, an address of a mobility control function (MCF) currently serving the mobile device. Components in the system use the TMDI to direct messages to the appropriate MCF.

20 Claims, 4 Drawing Sheets

10
20
22
24
BS
26
RNC
40
42
MCF
44
48
CA
50
FS
52
54
56
HLR/ AUC
60
62
PSTN
64
DATA

RNC
26a
102a
a
RNC
26b
102b
a
RNC
26c
102c
b
104a
104c
100
110
MCF
42
44a
44b
44c

42
MCF
TO HLR/AUC 56
TO RAN 20
TO CA POOL 52
I/F
200
PROCESSOR
202
P.M
206
208
204
210

300
320
322
324
A
DATA (TMDI)
I/F
PROCESSOR
306
I/F
302
304
310
308
312
C.P
330
340
342
344
TMDI
334
C.P.M.NUM
DATA
332

START
600
RECEIVE FIRST MESSAGE FROM MOBILE DEVICE
602
EXTRACT TMDI
604
RETRIEVE ADDRESSING INFORMATION
606
CONCATENATE ADDRESSING INFORMATION AND TMDI TO FORM ADDRESS FIELD FOR SECOND MESSAGE
608
INCLUDE DATA FROM FIRST MESSAGE IN DATA FIELD OF SECOND MESSAGE
610
COMMUNICATE SECOND MESSAGE
END

METHOD AND APPARATUS FOR REGISTERING A MOBILE DEVICE

TECHNICAL FIELD OF THE INVENTION

This invention relates generally to mobile communications, and more particularly to a method and apparatus for registering a mobile device.

BACKGROUND OF THE INVENTION

Communication networks have experienced dramatic growth due to increasing demands for a variety of communication services. This demand may be met by increasing capacity on existing networks, as well as adapting new technologies to provide more diverse services to customers. One area of particular growth is mobile communication services, where customers continue to demand higher bandwidth and greater access.

Existing mobile communication systems, such as cellular telephone networks, include a radio access infrastructure to couple wireless devices to existing networks, such as the public switched telephone network (PSTN). Newer technologies, such as packet-based networks, offer effective opportunities to couple the radio access infrastructure to a variety of networks to provide mobile communication services to customers.

SUMMARY OF THE INVENTION

The present invention solves many of the disadvantages and problems associated with prior communication systems. In particular, certain embodiments of the present invention provide a method and apparatus for registering a mobile device that operates in conjunction with a core packet network. Other embodiments of the present invention provide a method and apparatus for communicating a subscriber message between a radio access network and a core packet network.

In a particular embodiment of the present invention, a method for registering a mobile device includes: receiving a registration request from a mobile device; assigning a temporary mobile device identifier (TMDI), wherein the TMDI comprises at least a portion of an address of a mobility control function (MCF) serving the mobile device; and communicating the TMDI to the mobile device.

In another embodiment of the present invention, an apparatus for registering a mobile device includes an interface that receives a registration request from a mobile device. A processor coupled to the interface assigns a TMDI that includes at least a portion of an address of an MCF serving the mobile device. The interface communicates the TMDI to the mobile device in response to the registration request.

In yet another embodiment of the present invention, a method for communicating a subscriber message between a radio access network and a core packet network includes: receiving a first message from the radio access network; extracting a TMDI from the first message; and generating a second message with an address field including at least a portion of the TMDI.

In still another embodiment of the present invention, an apparatus for communicating a subscriber message between a radio access network and a core packet network includes an interface that receives a first message from the radio access network. A processor coupled to the interface extracts a TMDI from the first message and generates a second message with an address field including at least a portion of the TMDI.

Technical advantages of certain embodiments of the present invention include a method and apparatus for registering a mobile device that operates in conjunction with a core packet network. In particular embodiments, a core packet network couples a radio access network (RAN) to a circuit-switched network, such as the public switched network (PSTN). The core packet network includes a number of mobility control functions (MCFs) that can register and continue to provide mobile services to mobile devices. While registering a mobile device, each MCF may assign a temporary mobile device identifier (TMDI) that identifies the serving MCF. In this manner, components of the system may use the TMDI to route further messages from the mobile device to the serving MCF. In further embodiments, a routing function may distribute registration requests received from mobile devices to a pool of MCFs to provide load sharing and redundancy capabilities. This allows the system to distribute mobility management control across a number of MCFS, and to provide dynamic selection of the appropriate MCF for each registering mobile device.

Other technical advantages of certain embodiments of the present invention include the ability of routers or other components within or outside the core packet network to route messages received from mobile devices to the appropriate serving MCF. Since, upon registration of the mobile device, the serving MCF assigns a TMDI that identifies, at least in part, an address or subaddress of the MCF, other components within the communication system can use the TMDI to forward messages received from the mobile device to the appropriate MCF. This function may be performed, for example, at a radio network controller (RNC) within the RAN, at a router within the core packet network, or at some other appropriate component in the communication system. In particular embodiments, a selected component within the system serves as an address translator between the RAN and the core packet network. Other technical advantages will be readily apparent to one skilled in the art in view of the attached description, figures, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
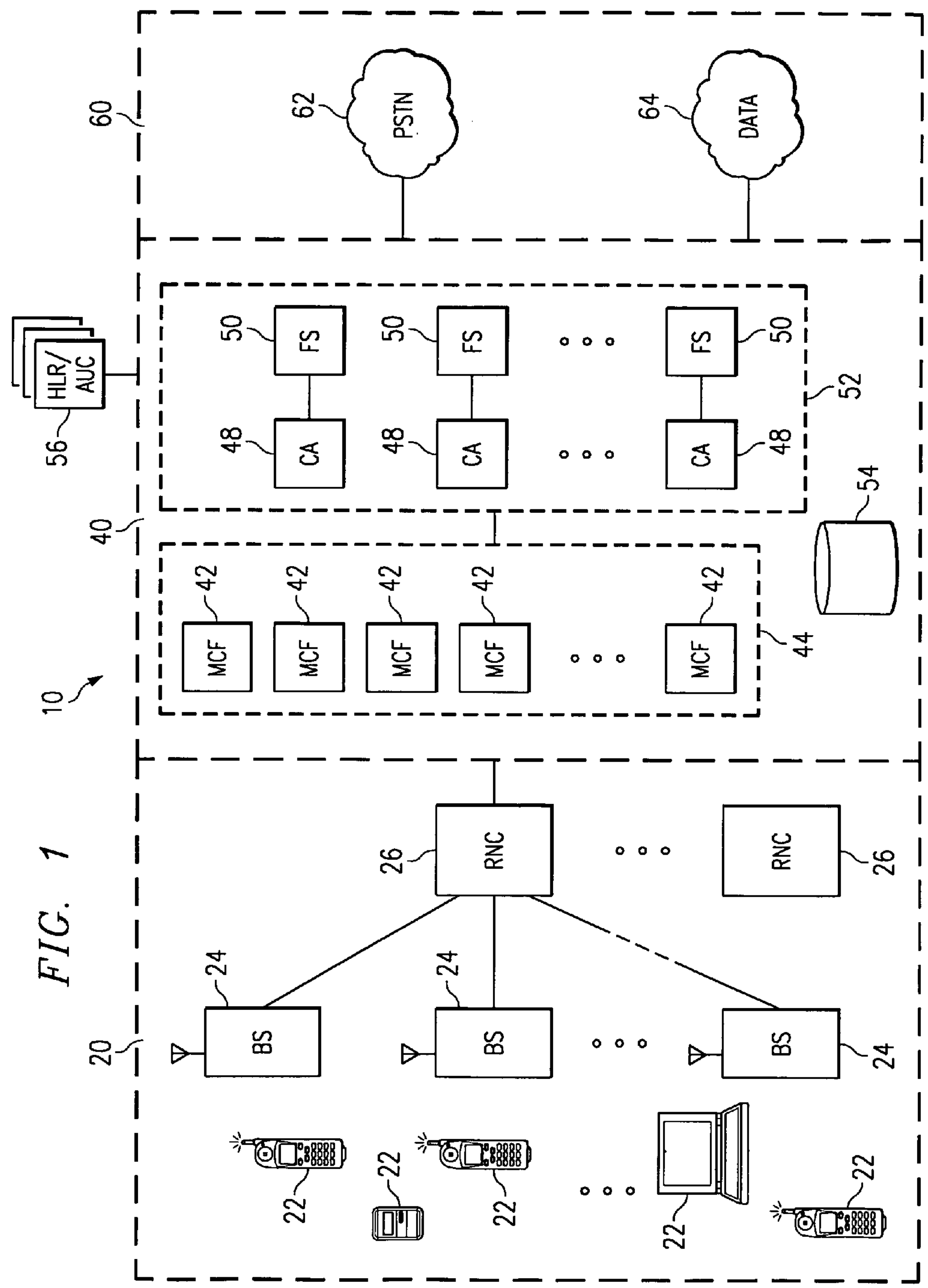
FIG. 1 illustrates a communication system incorporating certain aspects of the present invention.

FIG. 1 illustrates a communication system 10 that includes a radio access network (RAN) 20, a core packet network 40, and any number of service networks 60. Networks 20, 40, and 60 operate together to provide mobile communication services to customers operating mobile devices 22. These services may include the communication of voice, data, video, or other information (generally referred to as data) between components in system 10. In particular embodiments, core packet network 40 is arranged to provide distributed mobility management control, load sharing, scalability, and redundancy in system 10.

Mobile devices 22 may include cellular telephones, pagers, wireless personal digital assistants (PDAs), or other wireless device (generally referred to as mobile devices 22). Each mobile device 22 communicates with at least one associated base station (BS) 24 serving a geographic region in system 10. RAN 20 incorporates any appropriate hand-off or mobility technology to allow another BS 24 to provide communication services as mobile device 22 moves into its service region. Multiple BSs 24 couple to a radio network controller (RNC) 26 that manages the overall allocation of bandwidth, hand-off, and other management and support activities of RAN 20.

In a typical arrangement of RAN 20, one BS 24 may service at any given time a number of mobile devices 22. In addition, one RNC 26 may service a number of BS 24. This hierarchical arrangement is typical, but RAN 20 contemplates any hierarchical arrangement and number of components to provide communication services to mobile devices 22.

Core packet network 40 couples to RNC 26 of RAN 20, and provides subscriber authorization, mobility control, call processing, and access to other enhanced features provided by service networks 60. Core packet network 40 includes a number of mobility control function (MCFs) 42 that authenticate and register mobile devices 22, and provide subsequent processing of messages from mobile devices 22. MCFs 42 are arranged in a group or MCF pool 44, which provides a number of technical advantages. This distributed arrangement of MCFs 42 into MCF pool 44 allows registration requests from mobile devices 22 to be dynamically assigned to particular MCFs 42 based on load balancing, redundancy, and other suitable factors. MCFs 42 may be added, deleted, or grouped in a manner to provide extensible and scalable deployment of core packet network 40.

In a particular embodiment in which system 10 provides voice services to mobile devices 22, core packet network 40 may also include a number of call agents (CAs) 48 and associated feature servers (FSs) 50. Each CA 48 and/or FS 50 provides enhanced call processing, basic and enhanced call services, and other features to mobile devices 22. In a similar manner as MCFs 42, CAs 42 and associate FSs 50 may be arranged in a grouping or CA pool 52 that supports the scalable and extensible architecture of core packet network 40.

To provide registration, mobility, call processing, and feature delivery services, core packet network 40 maintains a centralized or distributed database or memory 54 that stores information associated with subscribers, loading characteristics of pools 44 and 52, redundancy and failover characteristics of pools 44 and 52, and any other suitable information to provide the functions and services of core packet network 40. To perform subscriber authentication, core packet network 40 couples to one or more home location registers and/or authentication centers (HLR/AUCs) 56 associated with mobile devices 22.

Service networks 60 include any additional network or communication components, either in hardware and/or software, that provide connectivity and/or services to mobile devices 22. For example, service networks 60 may include a circuit-switched network, such as the public switched telephone network (PSTN) 62. Service networks 60 may also include circuit-switched or packet-based data network 64, which may include components of or provide access to a global computer network, such as the Internet. A packet-based data network 64 may communicate packets, cells, or any other portion of information (generally referred to as packets). In general, service networks 60 contemplate any arrangement and number of hardware and/or software components that provide connectivity and/or services to mobile devices 22.

In operation, mobile device 22 in RAN 20 communicates a registration request, such as a location update message, an initial message, or any other suitable communication that indicates the desire of a user of mobile device 22 to access communication services provided by system 10 (collectively referred to as a registration request). The serving BS 24 receives the registration request and communicates this request to RNC 26. Core packet network 40 then receives the request from RNC 26 at a selected MCF 42 within MCF pool 44. In a particular embodiment, the request is forwarded to the selected MCF 42 based on loading and/or redundancy characteristics. MCF 42 then communicates an authentication request for mobile device 22 to HLR/AUC 56.

If HLR/AUC 56 authenticates the requesting mobile device 22, then MCF 42 receives and stores subscriber information, locally, in memory 54, or other suitable location. MCF 42 also assigns a temporary mobile device identifier, address, or other suitable information that identifies mobile device 22 and/or the user of mobile device 22 (generally referred to as TMDI). The TMDI may include any arrangement of information that, at least in part, directly or indirectly identifies MCF 42. One particular advantage of certain embodiments of system 10 is that the TMDI assigned by MCF 42 includes, at least in part, the address of the selected MCF 42. In this manner, components of RAN 20 and/or core packet network 40 may forward subsequent communications from mobile device 22 to the appropriate MCF 42 using the assigned TMDI. Moreover, embedding meaningful address information into the TMDI allows dynamic allocation of MCFs 42 in MCF pool 44 as core network 40 receives additional registration requests from mobile devices 22. MCF 42 communicates the TMDI to the mobile device 22 using RNC 26 and serving BS 24. Therefore, in subsequent communications, mobile device 22 will include the identifying TMDI.

Now assume a registered mobile device 22 generates a subsequent message which includes the previously assigned TMDI. Mobile device 22 communicates the message to serving BS 24, which in turn communicates the message to RNC 26. Components within RNC 26 or core packet network 40 may then extract the TMDI and use this information for addressing the message to the appropriate MCF 42 that originally registered mobile device 22. This TMDI extraction and addressing technique ensures that communications from a registered mobile device 22 reach the appropriate MCF 42. MCF 42 then receives and processes the message. To perform this processing, MCF 42 may retrieve subscriber information of mobile device 22 previously stored during the registration process. MCF 42 may also request further call processing resources from CA 48 and/or FS 50 in CA pool 52. Assigned CA 48 and/or FS 50 may then establish communication paths within selected service networks 60, such as PSTN 62 or data network 64.

Figure 2:
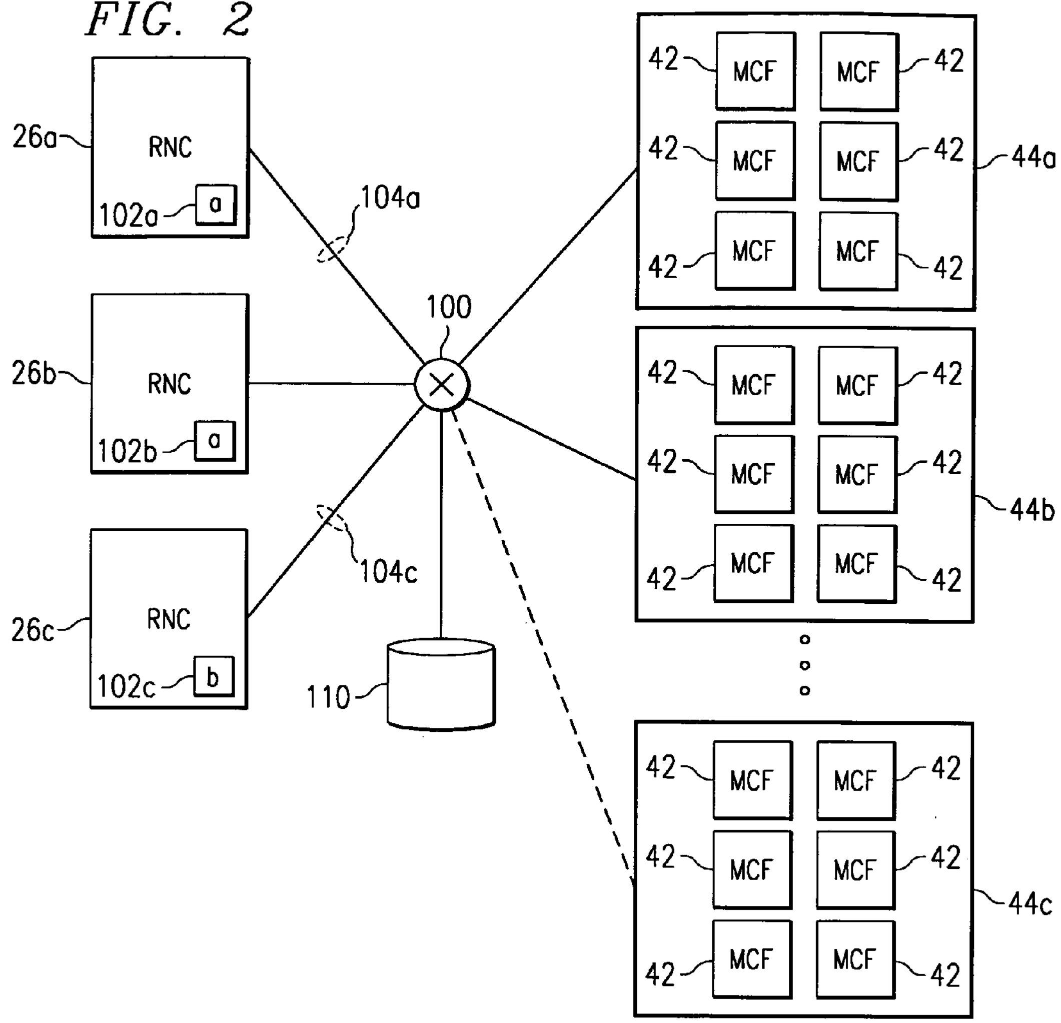
FIG. 2 illustrates in more detail one embodiment of certain components in the communication system.

FIG. 2 illustrates in more detail components of system 10 arranged to provide distributed and redundant mobility control to mobile devices 22. RNCs **26*a*, 26*b*, and 26*c* are coupled to MCF pools 44*a* and 44*b* using a router 100. In this example, the TMDI extraction and addressing function may be performed by RNCs 26 or router 100 to distribute mobility control management among pools 44***a* and 44*b*.

In a first embodiment, assume RNCs 26 perform a TMDI extraction and addressing function. In this embodiment, RNC 26*a* may receive a message from base station (BS) 24 serving mobile device 22. RNC 26*a* then extracts the TMDI and may also use an additional stored address 102*a* that identifies core packet network 40 and/or MCF pool 44 serving RNC 26*a*. Using the extracted TMDI and an optional stored address 102*a*, RNC 26*a* then generates a message 104*a* with an address that specifies, for example, MCF pool 44*a* and the associated MCF 42 serving mobile device 22. Similarly, RNC 26*c* may translate a message from mobile device 22 using the TMDI and stored address information 102*c*. Message 104*c* includes the relevant address information that allows router 100 to forward message 104*c* to the appropriate MCF 42 in MCF pool 44*b*.

In another embodiment, the TMDI extraction and addressing function may be performed by router 100 using stored addressing or mapping information 110 that associates RNCs 26 to MCF pools 44. In addition, router 100 may receive registration requests from mobile devices 22. Since these messages may not include a TMDI, router 100 may also maintain in memory 110 load balancing or redundancy characteristics of MCF pools 44 and MCFs 42. Based on this information, router 100 may direct these initial messages to the appropriate MCF pool 44 and/or associated MCF 42 to achieve load sharing and/or redundancy capabilities. For example, MCF pool 44*b* may act as a backup to MCF pool 44*a*. Router 100 may be notified of malfunction or error in MCF pool 44*a*, store this information in memory 110, and direct future registration traffic to MCF pool 44*b*. Similarly, MCF pools 44*a* and 44*b* may both be available, but router 100 selects the appropriate MCF pool 44 and associated MCF 42 based on loading or capacity characteristics. This distributed architecture of MCF pools 44 allows an additional MCF pool 44*c* to be added for scalability or redundancy purposes, and router 100 reflects this addition in memory 110.

Although FIG. 2 illustrates particular embodiments of TMDI extraction and addressing, system 10 contemplates any suitable technique and hierarchical addressing to direct messages from mobile devices 22 to the appropriate MCF 42. For example, the TMDI may specify an address for a particular MCF 42, with pre-stored addresses 102 or memory 110 specifying addresses of MCF pool 44 and/or core packet network 40. With hierarchical addressing, such as the addressing technique used by the Internet protocol, system 10 can adopt any appropriate addressing scheme. In any suitable addressing scheme, the TMDI extracted from the message from the mobile device 22 identifies, at least in part, its serving MCF 42.

Figure 3:
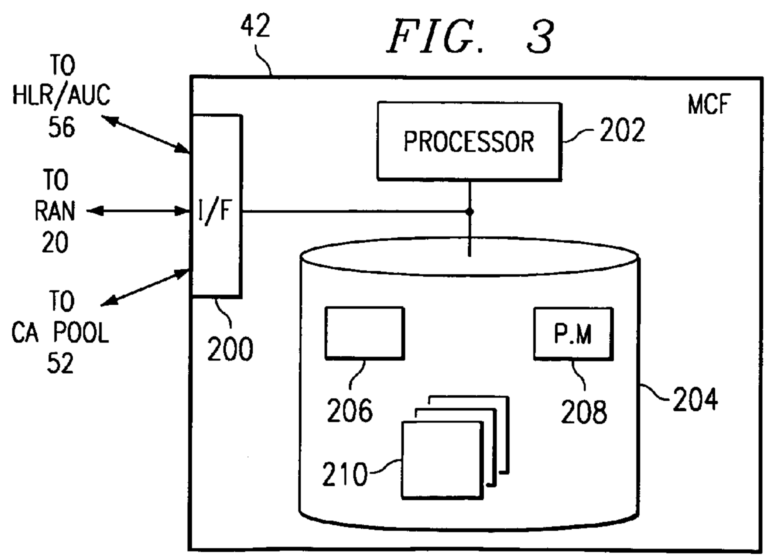
FIG. 3 illustrates in more detail a mobility control function (MCF) in the communication system.

FIG. 3 illustrates in more detail MCF 42, which includes an interface 200, a processor 202, and a memory 204. Interface 200 may be a packet network interface that provides connectivity to RAN 20, CA pool 52, and HLR/AUC 56, directly or through one or more intervening components. Processor 202 accesses a program 206 maintained in memory 204 to control the overall operation and function of MCF 42. Memory 204 may be any centralized or distributed form of volatile or nonvolatile memory that also stores address information 208 and subscriber information 210.

In operation, MCF 42 receives a registration request from mobile device 22 in RAN 20 at interface 200. Processor 202 then initiates communication of an authentication request to HLR/AUC 56. Upon receiving a positive response, processor 202 then assigns a TMDI to mobile device 22 that includes at least a portion of the address (M) of MCF 42 stored in address information 208. In a particular embodiment, the assigned TMDI may also include at least a portion of the address (P) for MCF pool 44. Processor 202 may also request and store subscriber information 210 in memory 204. Therefore, the registration of a mobile device 22 by MCF 42 may include authentication, assignment of a TMDI that identifies MCF 42, and the storage of related subscriber information 210.

After registration, MCF 42 receives additional messages from mobile device 22 addressed to arrive at MCF 42 using the TMDI extraction and addressing technique described above. Upon receiving these subsequent messages from subscriber 22, processor 202 processes these messages with, in certain embodiments, access to subscriber information 210. One result of message processing performed by MCF 42 may be further communication with a designated or available CA 48 and/or FS 50 in CA pool 52.

Figure 4:
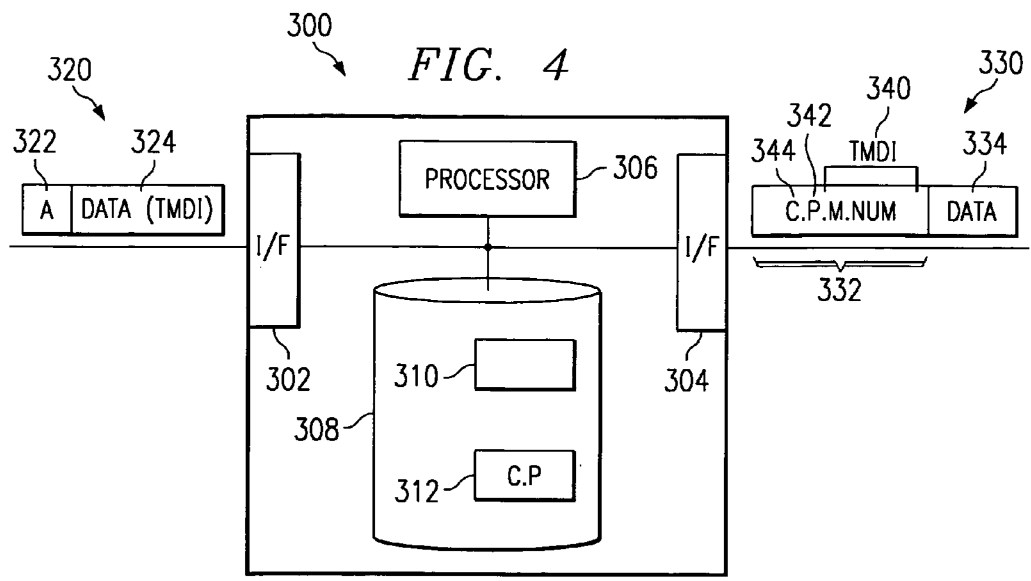
FIG. 4 illustrates a component in the communication system that communicates a subscriber message.

FIG. 4 illustrates a component 300 within system 10 that performs the TMDI extraction and addressing technique to communicate a subscriber message between RAN 20 and core packet network 40. Component 300 represents the functionality performed at RNC 26, router 100, and/or other appropriate component within system 10. Component 300 represents the general case where this functionality may be performed at a variety of locations within system 10.

Component 300 includes a first interface 302, a second interface 304, a processor 306, and a memory 308. In some embodiments, interfaces 302 and 304 may be a single interface capable of communicating packets of information. However, in other embodiments, such as when component 300 is part of RNC 26, interface 302 for communicating information with BSs 24 may operate using a different protocol than interface 304 that communicates packets with core packet network 40. For example, first interface 302 may communicate using a time division multiplexed (TDM) protocol, whereas interface 304 employs a packet protocol. Similarly, the addressing schemes employed by interfaces 302 and 304 may be different.

Processor 306 accesses a program 310 stored in memory 308 to control the overall operation and function of component 300. Memory 308 may be any form of volatile or nonvolatile memory, and also stores address information 312 that identifies, for example, the address (C) of core packet network 40 and the address (P) of MCF pool 44 associated with component 300.

In operation, component 300 receives a message 320 from mobile device 22 that has already been registered by a serving MCF 42 in core packet network 40. Message 320 includes an address field 322 containing address information consistent with the communication protocol supported by interface 302, and a data field 324 that includes, at least in part, a TMDI 326 assigned to mobile device 22. Processor 306 extracts the TMDI from data field 324, retrieves address information 312 from memory 308, and generates a message 330 for communication using second interface 304. Message 330 includes an address field 332 and a data field 334. Address field 332 includes at least a portion of TMDI 326 that designates the serving MCF 42 (M) and may also include some identifier of mobile device 22 (NUM). Address field 332 may also include an address 342 (P) for MCF pool 44 and an address 344 (C) for core packet network 40. Both addresses 342 and 344 may be derived from address information 312 stored in memory 308.

Address field 332 of message 330 illustrates one hierarchical approach to identify the particular mobile device 22, serving MCF 42, associated MCF pool 44, and core packet network 40. This particular addressing scheme may be suitable for use in existing protocols, such as the Internet protocol, and may find particular use in version six of the Internet protocol that provides a 128-bit address. This allows each of the four parts of address field 332 to contain up to 32-bits of addressing space. Although address field 322 of message 330 includes four parts, system 10 contemplates any address scheme using more or fewer parts of the same or varying lengths that utilizes at least a portion of TMDI 326 to identify serving MCF 42. Interface 304 communicates message 330 through core packet network 40 to reach the intended recipient (MCF 42 that registered mobile device 22) and identify the originator of the message (mobile device 22).

Figure 5:
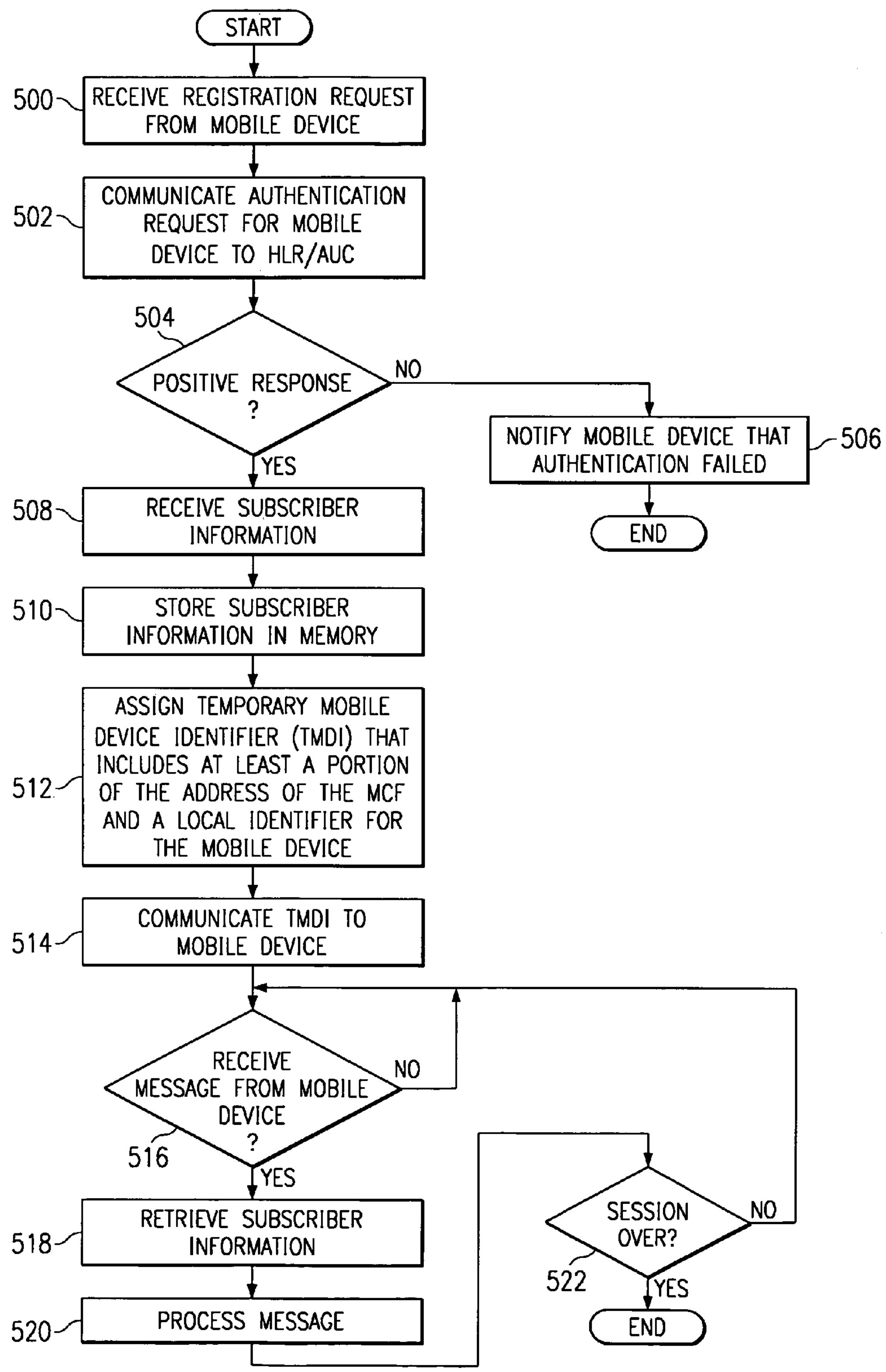
FIG. 5 is a flowchart of a method for registering a mobile device in the communication system.

FIG. 5 illustrates a flow chart of a method for registering mobile device 22 in system 10. The method begins at step 500 where MCF 42 receives a registration request from mobile device 22. The registration request may be a location update message, a request to authenticate, or other initial message generated by mobile device 22 to indicate a desire to receive communication services. In response to receiving the registration request, MCF 42 communicates an authentication request for mobile device 22 to an appropriate HLR/AUC 56 at step 502. In a particular embodiment, MCF 42 extracts information from the authentication request to identify the appropriate HLR/AUC 56 serving mobile device 22. If MCF 42 does not receive a positive response from HLR/AUC 56 at step 504, then MCF 42 notifies mobile device 22 that the authentication failed at step 506 and the method ends.

If MCF 42 receives a positive response from HLR/AUC 56 at step 504, then MCF 42 may receive subscriber information 210 at step 508, and store subscriber information 210 in memory 204 at step 510. MCF 42 assigns a temporary mobile device identifier (TMDI) that includes at least a portion of the address of MCF 42 and a local identifier for mobile device 22 at step 512. MCF 42 communicates the assigned TMDI to mobile device 22 at step 514.

Upon registering mobile device 22 by assigning and communicating the TMDI, MCF 42 waits to receive a further message from mobile device 22 at step 516. If MCF 42 receives a message addressed by components in RAN 20 and/or core packet network 40 using the TMDI, then MCF 42 retrieves subscriber information 210 at step 518, and proceeds to process the message at step 520. If the session is not over as determined at step 522, then MCF 42 prepares to receive another message at step 516.

Figure 6:
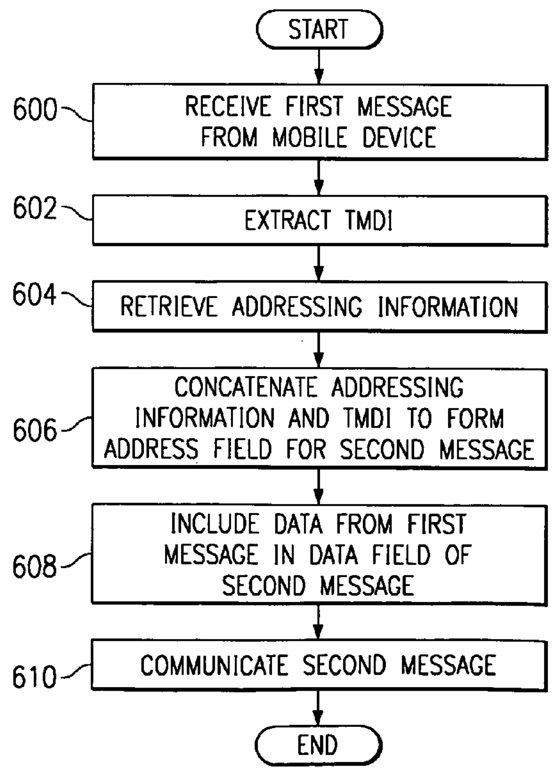
FIG. 6 is a flowchart of a method for communicating a subscriber message in the communication system.

FIG. 6 is a flow chart of a method for communicating a subscriber message between RAN 20 and core packet network 40 in system 10. This method may be performed in components within RAN 20, such as RNC 26, and/or within components in core packet network 40, such as router 100. The method begins at step 600 where component 300 receives a first message from mobile device 22. Component 300 extracts the TMDI at step 602 and retrieves address information 312 stored in memory 308 at step 604. This address information 312 may include address 342 specifying MCF pool 44 and/or address 344 specifying core packet network 40. Component 300 concatenates retrieved address information 312 and at least a portion of the TMDI to form the address field for a second message at step 606. Component 300 includes data from the first message in the data field of the second message at step 608. Component 300 communicates the second message addressed to reach its intended recipient (MCF 42 that registered mobile device) and to identify the originator (mobile device 22) at step 610.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for registering a mobile device, comprising:
receiving a registration request from a mobile device;
assigning a temporary mobile device identifier (TMDI), wherein the TMDI comprises at least a portion of an address of a mobility control function (MCF) serving the mobile device; and
communicating the TMDI to the mobile device;
wherein the TMDI further comprises:
a first part designating a selected one of a plurality of pools within a core packet network, each pool comprising a plurality of mobility control functions (MCFs);
a second part designating a selected one of the MCFs in the selected pool of the core packet network to service the mobile device; and
a third part designating the mobile device.

2. The method of claim 1, wherein the step of receiving comprises:
receiving, at a router, a registration request from a mobile device; and
communicating the registration request to a selected one of a plurality of mobility control functions (MCFs) based on the loading characteristics of the MCFs.

3. The method of claim 1, wherein the TMDI comprises:
a first part designating a selected one of a plurality of mobility control functions (MCFs) to service the mobile device; and
a second part designating a local identifier of the mobile device.

4. The method of claim 1, further comprising:
receiving subscriber information from the mobile device;
storing the subscriber information at the MCF;
receiving a message from the mobile device, the message identifying the MCF and the mobile device; and
retrieving the subscriber information to process the message.

5. The method of claim 1, further comprising the following steps performed before assigning a temporary mobile device identifier (TMDI):
communicating an authentication request to a remote location; and
receiving a positive authentication response from the remote location.

6. The method of claim 5, wherein the remote location comprises a home location register of the mobile device.

7. The method of claim 1, wherein the TMDI comprises at least a portion of a 128-bit Internet protocol address.

8. A system for providing a distributed mobility control function to a plurality of mobile devices, comprising:
a router operable to receive a plurality of registration requests from a plurality of mobile devices and to route the registration requests to a plurality of mobility control functions (MCFs) based on the loading characteristics of the MCFs; and
the MCFs operable to receive the registration requests, each MCF further operable to assign a temporary mobile device identifier (TMDI) that includes at least a portion of an address of the MCF;
wherein the TMDI further comprises:

a first part designating a selected one of a plurality of pools within a core packet network, each pool comprising the plurality of MCFs;

a second part designating a selected one of the MCFs in the selected pool of the core packet network to service the mobile device; and a third part designating the mobile device.

9. The system of claim 8, wherein each MCF is further operable to:

communicate an authentication request to a remote location;

receive a positive authentication response from the remote location; and communicate the TMDI to the mobile device.

10. The system of claim 8, wherein the TMDI comprises:

a first part designating a selected one of a plurality of mobility control functions (MCFs) to service the mobile device; and a second part designating a local identifier of the mobile device.

11. The system of claim 8, wherein the TMDI comprises at least a portion of a 128-bit Internet protocol address.

12. An apparatus for registering a mobile device, comprising:

an interface operable to receive a registration request from a mobile device; and a processor coupled to the interface and operable to assign a temporary mobile device identifier (TMDI), wherein the TMDI comprises at least a portion of an address of a mobility control function (MCF) serving the mobile device;

wherein the interface is further operable to communicate the TMDI to the mobile device in response to the registration request;

wherein the TMDI further comprises:

a first part designating a selected one of a plurality of pools within a core packet network, each pool comprising a plurality of mobility control functions (MCFs);

a second part designating a selected one of the MCFs in the selected pool of the core packet network to service the mobile device; and a third part designating the mobile device.

13. The apparatus of claim 12, wherein the TMDI comprises:

a first part designating a selected one of a plurality of mobility control functions (MCFs) to service the mobile device; and a second part designating a local identifier of the mobile device.

14. The apparatus of claim 12, further comprising a memory operable to store subscriber information received from the mobile device, wherein the processor retrieves the subscriber information from the memory to process a message received from the mobile device.

15. The apparatus of claim 12, wherein the interface is further operable to communicate an authentication request to a remote location and to receive an authentication response from the remote location.

16. The apparatus of claim 12, wherein the TMDI comprises at least a portion of a 128-bit Internet protocol address.

17. An apparatus for registering a mobile device, comprising:

means for receiving a registration request from a mobile device;

means for assigning a temporary mobile device identifier (TMDI), wherein the TMDI comprises at least a portion of an address of a mobility control function (MCF) and a local identifier of the mobile device; and means for communicating the TMDI to the mobile device;

wherein the TMDI further comprises:

a first part designating a selected one of a plurality of pools within a core packet network, each pool comprising a plurality of mobility control functions (MCFs);

a second part designating a selected one of the MCFs in the selected pool of the core packet network to service the mobile device; and a third part designating the mobile device.

18. The apparatus of claim 17, wherein the TMDI comprises at least a portion of a 128-bit Internet protocol address.

19. Logic encoded in media for registering a mobile device, the logic operable to:

receive a registration request from a mobile device;

assign a temporary mobile device identifier (TMDI), wherein the TMDI comprises at least a portion of an address of a mobility control function (MCF) and a local identifier of the mobile device; and communicate the TMDI to the mobile device;

wherein the TMDI further comprises:

a first part designating a selected one of a plurality of pools within a core packet network, each pool comprising a plurality of mobility control functions (MCFs);

a second part designating a selected one of the MCFs in the selected pool of the core packet network to service the mobile device; and a third part designating the mobile device.

20. The logic of claim 19, wherein the TMDI comprises at least a portion of a 128-bit Internet protocol address.

* * * * *